(12) United States Patent
Hatmaker, Jr.

(10) Patent No.: US 11,085,506 B2
(45) Date of Patent: Aug. 10, 2021

(54) VINE INHIBITING CONE AND METHOD OF USE THEREOF

(71) Applicant: Dale Keith Hatmaker, Jr., Lafollette, TN (US)

(72) Inventor: Dale Keith Hatmaker, Jr., Lafollette, TN (US)

( * ) Notice: Subject to any disclaimer, the term of this patent is extended or adjusted under 35 U.S.C. 154(b) by 0 days.

(21) Appl. No.: 16/362,619

(22) Filed: Mar. 23, 2019

(65) Prior Publication Data

US 2020/0300336 A1    Sep. 24, 2020

(51) Int. Cl.
*E04H 12/20* (2006.01)
*F16G 11/00* (2006.01)
*A01G 9/12* (2006.01)

(52) U.S. Cl.
CPC .............. *F16G 11/00* (2013.01); *A01G 9/12* (2013.01); *E04H 12/20* (2013.01)

(58) Field of Classification Search
CPC ............ F16G 11/00; A01G 9/12; E04H 12/20

USPC .......................................................... 52/101
See application file for complete search history.

(56) References Cited

U.S. PATENT DOCUMENTS

| 1,933,818 | A | * | 11/1933 | Miller ...................... E04H 12/20 52/147 |
| 2,061,306 | A | | 11/1936 | Hocher et al. |
| 4,435,931 | A | | 3/1984 | Newbanks |
| 5,826,542 | A | * | 10/1998 | Allen ....................... H02G 7/00 119/57.9 |
| 6,410,856 | B1 | | 6/2002 | Kimble |
| 6,684,578 | B1 | | 2/2004 | Callahan |
| D757,372 | S | * | 5/2016 | Clinton ......................... D30/121 |

* cited by examiner

*Primary Examiner* — Patrick J Maestri
(74) *Attorney, Agent, or Firm* — Robert C. Corbett; Technology Law, PLLC

(57) ABSTRACT

A method of restricting the growth of vines along a guy wire includes possessing a member defining a tapered chamber having first and second openings. The chamber is tapered such that the chamber is widest at the first opening. The method further includes positioning the member such that the guy wire extends through the first opening, the second opening, and the tapered chamber.

12 Claims, 2 Drawing Sheets

VINE INHIBITING CONE AND METHOD OF USE THEREOF

TECHNICAL FIELD

This disclosure relates to methods and apparatuses for limiting the growth of vines.

BACKGROUND

Guy wires are often used to add stability to free-standing poles and other structures, including, for example, telephone and power line poles. Vines are plants that will grow along rigid structures, including guy wires. This can be problematic because the weight of the vine may damage the guy wire or the structure that the guy wire is stabilizing. Some vines, notably kudzu, can even climb the entire guy wire and then envelope telephone or power lines, which may interfere with signal or power transmission.

Kudzu often climbs up guy wires and either weaves into the hot wire or causes the pole to fall, causing an interruption in the power supply. Electric utilities must spend substantial resources to clear kudzu from power transmission lines.

SUMMARY

A method of restricting the growth of vines along a guy wire is provided. The method includes possessing a member defining a tapered chamber having first and second openings. The chamber is tapered such that the chamber is widest at the first opening. The method further includes positioning the member such that the guy wire extends through the first opening, the second opening, and the tapered chamber.

In use, the growing end of a vine climbing the guy wire will enter the chamber through the first opening. Once in the chamber, the tapered inner surface of the member will deflect the growth of the vine downward, causing the vine to succumb to its own weight. Furthermore, in one embodiment, the member defining the chamber is substantially opaque. The vine will sense the lack of light inside the chamber, which will also stop the vine from further growth along the guy wire.

Accordingly, the method provides a physical barrier that will effectively stop the growth of vines along guy wires. The method is cost-effective compared to the prior art because a single application of the member to a guy wire may prevent the growth of vines for several years, thereby eliminating the need to clear vine growth manually or through herbicides several times per year.

A corresponding system for restricting vine growth is also provided.

The above features and advantages and other features and advantages of the present disclosure are readily apparent from the following detailed description of the best modes for carrying out the disclosure when taken in connection with the accompanying drawings

DESCRIPTION OF THE PREFERRED EMBODIMENTS

Figure 1:
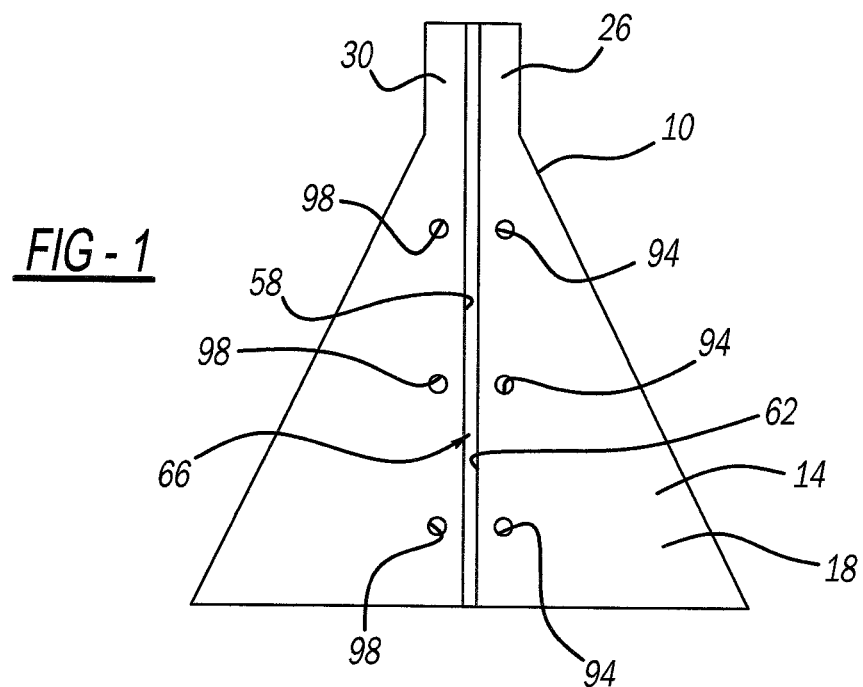
FIG. 1 is a schematic, side view of a member having a tapered chamber.

Referring to the Figures, wherein like reference numbers refer to like components throughout, a vine inhibiting cone assembly 8 includes a member 10. The member 10 includes a first part 14 that defines a frusto-conical outer surface 18 and a frusto-conical inner surface 22. The member 10 also includes a second part 26 that defines a cylindrical outer surface 30 and a cylindrical inner surface 34. The frusto-conical inner surface 22 and the cylindrical inner surface 34 cooperate to define a chamber 38 that extends through the member 10.

The first part 14 of the member 10 defines a first opening 42 to the chamber 38. The second part 26 of the member 10 defines a second opening 46 to the chamber 38. The chamber 38 includes a tapered, frusto-conical portion 50 defined by inner surface 22, and a cylindrical portion 54 defined by inner surface 34. The diameter of the frusto-conical portion 50 of the chamber 34 is largest at the first opening 42 and decreases with proximity to the cylindrical portion 54. The cylindrical portion 54 of the chamber 34 has a constant diameter between the frusto-conical portion 50 and the second opening 46.

It should be noted that, though the tapering portion 50 of the chamber 38 is frusto-conical, any tapering geometry may be employed within the scope of the claimed invention. For example, the tapering portion 50 and surface 22 may be a parabaloid such that the width of the chamber is wider at opening 42 and narrows with distance from the opening 42.

The member 10 also includes two edges 58, 62 that extend between the first and second openings 42, 46. Prior to installation on a guy wire, edges 58, 62 cooperate to define a third opening 66 therebetween, as shown in FIG. 1. The third opening 66 is contiguous with the first and second openings 42, 46.

Figure 2:
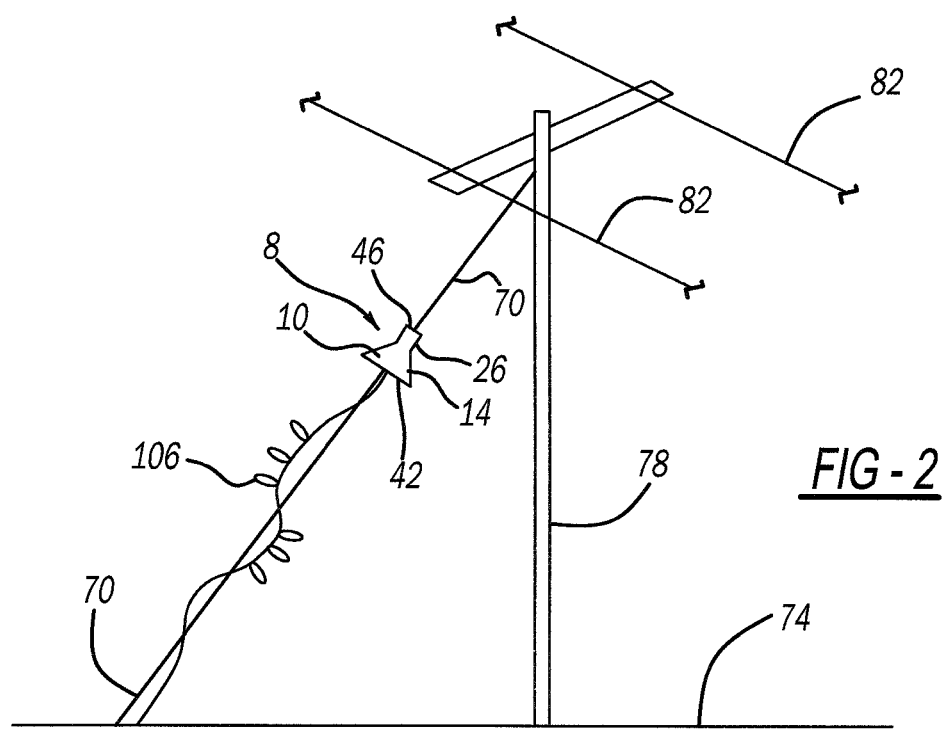
FIG. 2 is a schematic, side view of the member attached to a guy wire for a utility pole.

FIG. 2 depicts a method of use of the member 10. Referring specifically to FIG. 2, a guy wire 70 operatively interconnects the ground 74 and a vertical structure such as a utility pole 78 as understood by those skilled in the art. In the example shown in FIG. 2, the utility pole 78 supports a plurality of electrically conductive wires 82. Wires 82 may, for example, be electrical power transmission lines or telephone signal transmission lines. However, any guy wire stabilizing any structure may be employed within the scope of the claims. For example, a guy wire 70 may be employed with a radio transmission tower.

Figure 3:
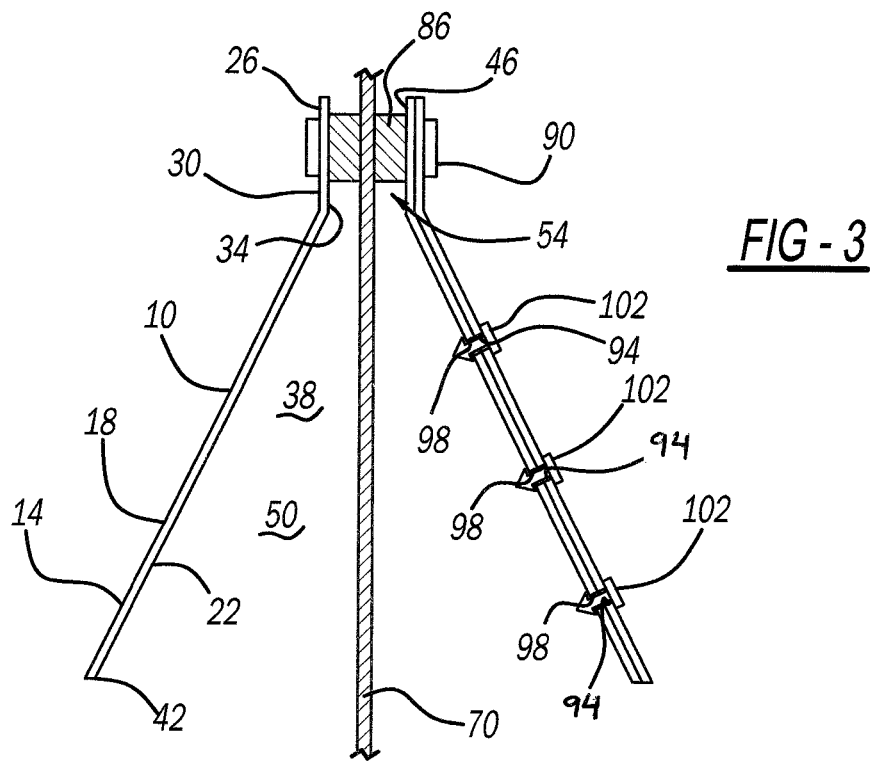
FIG. 3 is a schematic, cross-sectional side view of the member attached to the guy wire.
Figure 4:
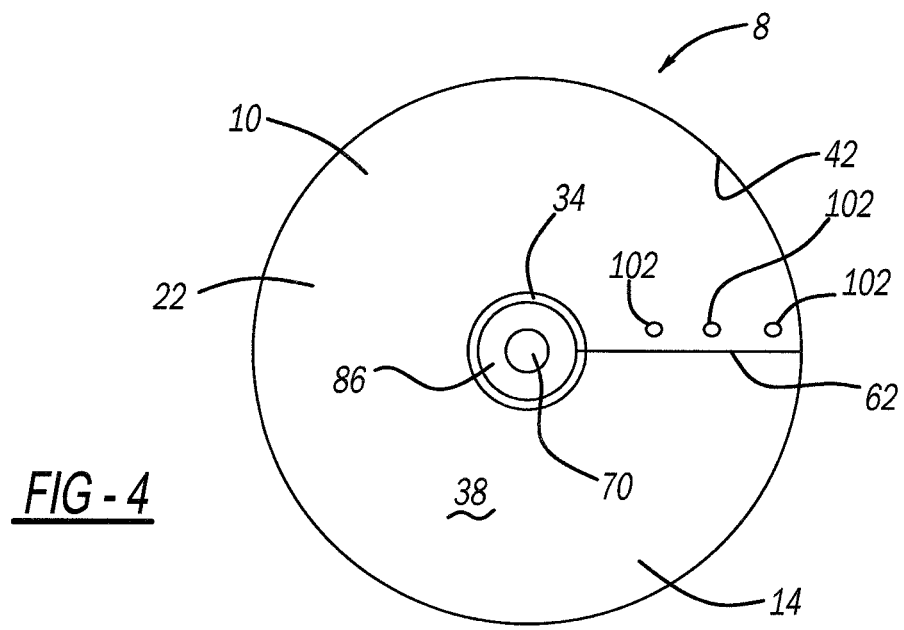
FIG. 4 is a schematic, bottom view of the member attached to the guy wire.

Referring to FIGS. 2-4, the guy wire 70 extends through the first opening 42, the chamber 38, and the second opening 46. As shown in FIGS. 3 and 4, the chamber 38 has only a single unobstructed opening, i.e., the first opening 42. The second opening 46 is entirely obstructed by the guy wire 70 and an elastomeric bushing member 86. The elastomeric bushing member 86 concentrically surrounds and contacts the guy wire 70, and fills the volume between the guy wire 70 and the cylindrical inner surface 34. The elastomeric bushing member 86 may, for example, be an annular member, or it may have another shape or configuration that is wrapped around the guy wire 70.

A clamp 90, such as a radiator clamp, is applied to the cylindrical outer surface 30 such that the clamp 90 exerts a compressive force radially inward on the second part 26. The compressive force is transmitted through the member 10 to the elastomeric bushing member 86 and the guy wire 70.

Accordingly, the clamp 90 retains the member 10 in place on the guy wire 70 and also ensures that the second opening 46 remains obstructed.

The third opening shown at 66 in FIG. 1 enables the placement of the guy wire 70 in the chamber 38. Placing the member 10 on the guy wire 70 includes inserting the guy wire 70 into the chamber 38 through the third opening 66 between edges 58, 62. The third opening 66 is then closed and/or obstructed as shown in FIGS. 3 and 4. In the embodiment depicted, the third opening 66 is closed by deforming the member 10 such that the edges 58, 62 do not define the third opening therebetween. The member 10 defines a first plurality of holes 94 adjacent to edge 62 and a second plurality of holes 98 adjacent to edge 58. To close the third opening 66, the member 10 is deformed such that each of the holes 94 is aligned with a respective one of the holes 98. Snap fasteners 102 are then inserted through the holes 94, 98 as shown in FIGS. 3 and 4 to maintain the closure of the third opening.

Referring again to FIG. 2, the first opening 42 is positioned such that a vine 106 growing upward along the guy wire 70 will enter the chamber 38 through the first opening 42. The inner surface 22 will then deflect the vine downward, preventing the continued growth of the vine 106 along the guy wire 70. The member 10 is preferably formed of a non-conductive polymeric material with a UV coating to prolong its life.

While the best modes for carrying out the invention have been described in detail, those familiar with the art to which this invention relates will recognize various alternative designs and embodiments for practicing the invention within the scope of the appended claims.

The invention claimed is:

1. A system for inhibiting vine growth comprising:
   a structure;
   a guy wire interconnecting the structure and the ground;
   a member defining a chamber having a first opening and a second opening;
   wherein the guy wire extends through the first opening, the chamber, and the second opening;
   wherein the chamber is tapered such that the chamber is widest at the first opening;
   wherein the chamber has only a single unobstructed opening; and wherein the single unobstructed opening is the first opening;
   an elastomeric bushing surrounding the guy wire and cooperating with the guy wire to obstruct the second opening.

2. The system of claim 1, wherein the member defines a cylindrical part defining a cylindrical portion of the chamber;
   wherein the elastomeric bushing is disposed within the cylindrical portion of the chamber; and
   wherein the system further comprises a clamp exerting a compressive force on the cylindrical part.

3. The system of claim 1, wherein the chamber is frustoconical.

4. The system of claim 1, wherein the member is polymeric.

5. The system of claim 1, wherein the first opening is lower than the second opening.

6. The system of claim 1, wherein the member defines a first edge extending from the first opening to the second opening, and a second edge extending from the first opening to the second opening; and
   wherein the system includes a plurality of fastening elements securing the first edge with respect to the second edge.

7. A method comprising:
   possessing a member defining a tapered chamber having first and second openings;
   positioning the member such that a guy wire extends through the first opening, the second opening, and the tapered chamber;
   configuring the member such that the chamber is characterized by a single unobstructed opening; said single unobstructed opening being the first opening; and
   applying an elastomeric bushing to the guy wire such that the bushing surrounds the guy wire; and applying a clamp to the member such that the clamp exerts a compressive force on the member and the bushing.

8. The method of claim 7, wherein the chamber is widest at the first opening.

9. The method of claim 8, wherein the first opening is lower than the second opening.

10. The method of claim 9, wherein the member has a first edge extending from the first opening to the second opening; wherein the member has a second edge extending from the first opening to the second opening; wherein the first edge and the second edge define a third opening therebetween; and wherein said positioning the member such that a guy wire extends through the first opening, the second opening, and the tapered chamber includes inserting the guy wire through the third opening.

11. The method of claim 10, further comprising closing the third opening after said inserting the guy wire through the third opening.

12. The method of claim 11, wherein said closing the third opening includes deforming the member such that the first edge and the second edge do not define the third opening.

* * * * *